(12) United States Patent
Amano et al.

(10) Patent No.: US 10,919,383 B2
(45) Date of Patent: Feb. 16, 2021

(54) FUEL TANK

(71) Applicant: TOYOTA JIDOSHA KABUSHIKI KAISHA, Toyota (JP)

(72) Inventors: Shinsuke Amano, Okazaki (JP); Toshiaki Asahara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 16/162,561

(22) Filed: Oct. 17, 2018

(65) Prior Publication Data

US 2019/0126745 A1    May 2, 2019

(30) Foreign Application Priority Data

Oct. 26, 2017 (JP) .................................. 2017-207282

(51) Int. Cl.
*B60K 15/03* (2006.01)
*B60K 15/077* (2006.01)
*B60K 15/063* (2006.01)

(52) U.S. Cl.
CPC ...... *B60K 15/077* (2013.01); *B60K 15/03177* (2013.01); *B60K 2015/0344* (2013.01); *B60K 2015/03453* (2013.01); *B60K 2015/0634* (2013.01); *B60K 2015/0775* (2013.01); *B60K 2015/0777* (2013.01)

(58) Field of Classification Search
CPC ............ B60K 15/077; B60K 15/03177; B60K 2015/0344; B60K 2015/03453; B60K 2015/0634; B60K 2015/0775; B60K 2015/0777; B65D 90/52; Y10T 137/86212

USPC ................. 220/563, 4.14, 553, 734; 137/574
See application file for complete search history.

(56) References Cited

U.S. PATENT DOCUMENTS

| 6,138,859 A | 10/2000 | Aulph et al. |
|---|---|---|
| 2006/0102634 A1 | 5/2006 | Potter et al. |
| 2012/0138606 A1 | 6/2012 | Varga |
| 2014/0014663 A1 | 1/2014 | Eulitz et al. |
| 2014/0110038 A1 | 4/2014 | Criel et al. |
| 2014/0158696 A1 | 6/2014 | Criel et al. |

(Continued)

FOREIGN PATENT DOCUMENTS

| CN | 204249813 U | 4/2015 |
|---|---|---|
| DE | 10 2012 009 157 A1 | 11/2013 |

(Continued)

*Primary Examiner* — James N Smalley
*Assistant Examiner* — Elizabeth J Volz
(74) *Attorney, Agent, or Firm* — Oblon, McClelland, Maier & Neustadt, L.L.P.

(57) ABSTRACT

There is provided a fuel tank including: a fuel tank main body enclosed by a floor wall, side walls and an upper wall; and a separator including a strut, a first plate portion in which a first penetrating hole that penetrates in a plate thickness direction is formed, and a second plate portion in which a second penetrating hole that penetrates in a plate thickness direction is formed, the second plate portion sandwiching the strut with the first plate portion and extending in a diametric direction at an opposite side of the strut from a side thereof at which the first plate portion is disposed, wherein at least one of shapes, sizes or numbers of the first penetrating hole and the second penetrating hole is set to be different such that fluid resistances at the first plate portion and the second plate portion are different.

7 Claims, 14 Drawing Sheets

(56) References Cited

U.S. PATENT DOCUMENTS

| | | | |
|---|---|---|---|
| 2014/0197174 A1 | 7/2014 | Boecker et al. | |
| 2014/0305936 A1 | 10/2014 | Gebert et al. | |
| 2016/0076666 A1* | 3/2016 | Milton | F16K 31/20 |
| | | | 137/399 |
| 2017/0232835 A1* | 8/2017 | Diestelhorst | B29C 48/0017 |
| | | | 220/562 |

FOREIGN PATENT DOCUMENTS

| | | |
|---|---|---|
| JP | 2006-207446 | 8/2006 |
| JP | 2014-516327 | 7/2014 |
| JP | 2014-141246 | 8/2014 |
| JP | 2015-504386 | 2/2015 |
| JP | 2015-160499 | 9/2015 |
| JP | 2015-160500 | 9/2015 |
| WO | WO 2014/053285 A1 | 4/2014 |
| WO | WO 2014/131685 A2 | 9/2014 |
| WO | WO 2014/131686 A2 | 9/2014 |
| WO | WO 2015/032924 A1 | 3/2015 |

* cited by examiner

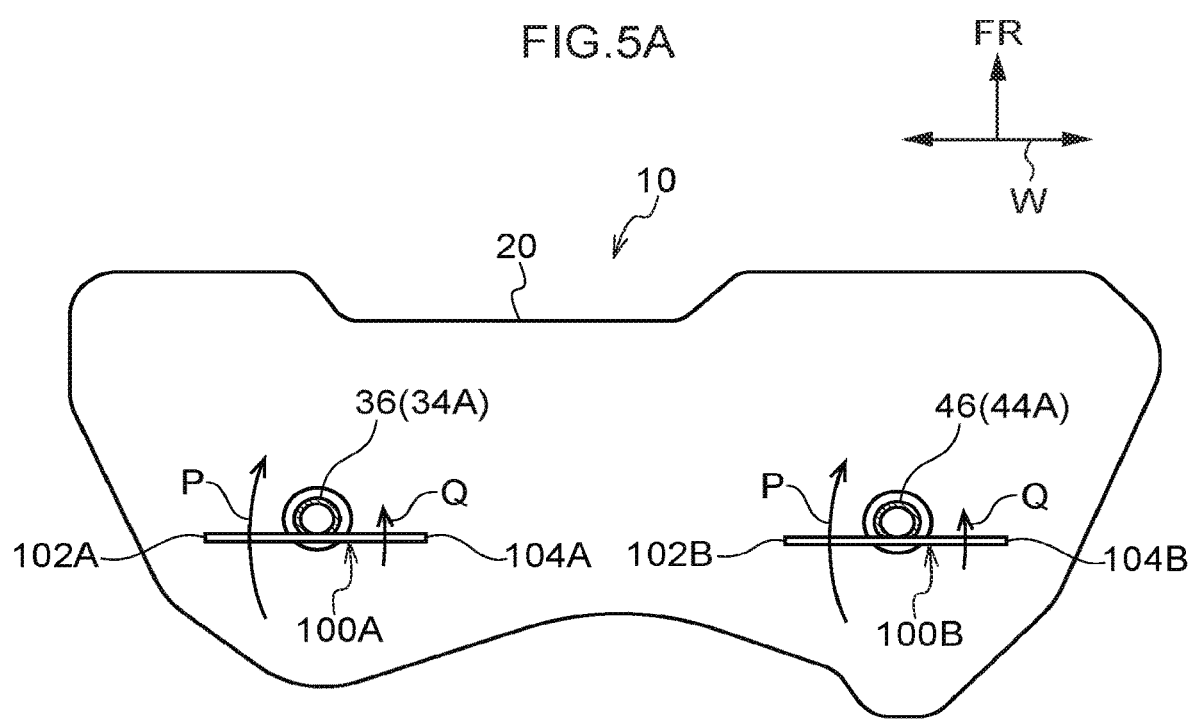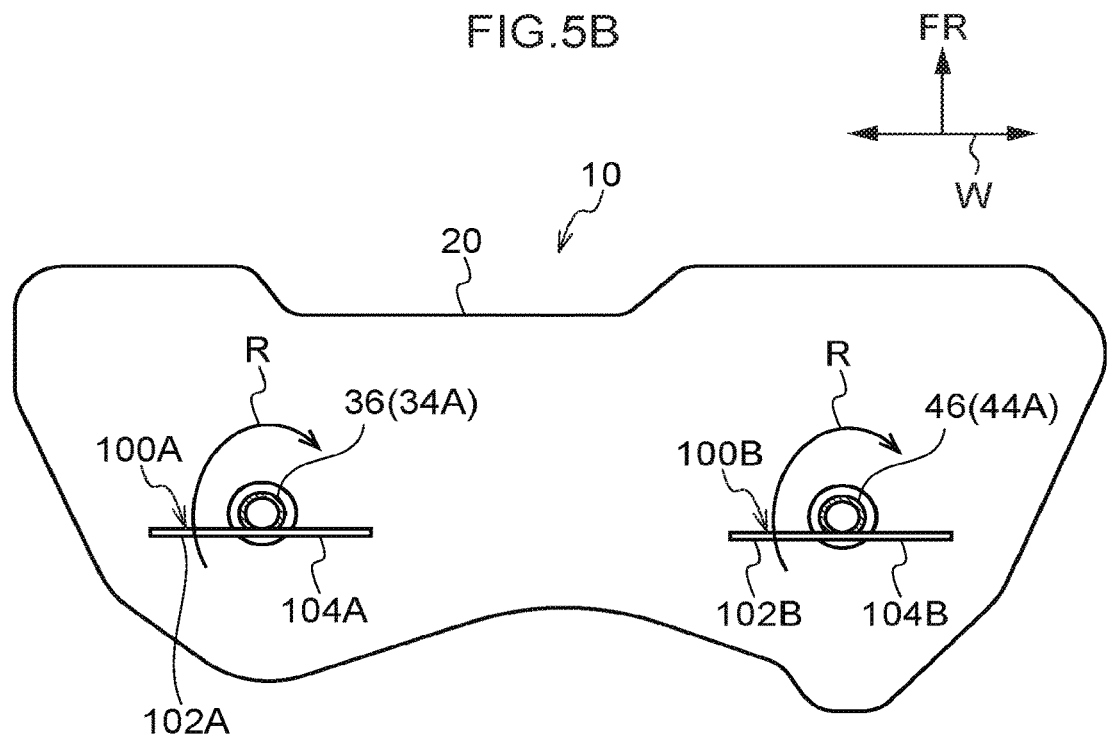

FUEL TANK

CROSS-REFERENCE TO RELATED APPLICATION

This application is based on and claims priority under 35 USC 119 from Japanese Patent Application No. 2017-207282 filed on Oct. 26, 2017, the disclosure of which is incorporated by reference herein.

BACKGROUND

Technical Field

The present disclosure relates to a fuel tank.

Related Art

Fuel tanks have a problem of fuel rocking within a fuel tank during acceleration or the like and noise being produced by the fuel impacting against wall faces of the tank.

As a countermeasure, suppressing rocking of fuel within a fuel tank by disposing separators formed of plate bodies inside the fuel tank has been proposed.

For example, a structure has been proposed (see Japanese Patent Application Laid-Open (JP-A) No. 2015-160500) in which a separator is attached to an outer wall of a fuel tank by a portion of a separator main body portion being inserted into an outer wall separator insertion hole formed in the tank outer wall and a separator attachment portion being welded to an outer face of the tank outer wall.

Even when a separator is disposed inside a fuel tank as in the conventional technology described above, there is scope for improvement in regard to suppressing the production of noise.

SUMMARY

In consideration of the circumstances described above, the present disclosure provides a fuel tank that may further suppress the production of noise in the fuel tank.

A fuel tank according to a first aspect of the present disclosure includes: a fuel tank main body that is enclosed by a floor wall, side walls and an upper wall, and inside which fuel is stored; and a separator including a strut provided at at least one of the floor wall or the upper wall, a first plate portion in which a first penetrating hole that penetrates in a plate thickness direction is formed, the first plate portion extending in a diametric direction from the strut, and a second plate portion in which a second penetrating hole that penetrates in a plate thickness direction is formed, the second plate portion sandwiching the strut with the first plate portion and extending in a diametric direction at an opposite side of the strut from a side thereof at which the first plate portion is disposed, wherein at least one of shapes, sizes or numbers of the first penetrating hole and the second penetrating hole is set to be different such that fluid resistances at the first plate portion and the second plate portion are different.

This fuel tank is equipped with the separator that includes the first plate portion and the second plate portion that are provided to sandwich the strut from opposite sides of the strut. Consequently, rocking of the fuel is suppressed by the first plate portion and the second plate portion, and the production of noise in the fuel tank is suppressed.

At least one of numbers, sizes and shapes of the first penetrating holes formed in the first plate portion and the second penetrating holes formed in the second plate portion is set to be different such that fluid resistances of the first plate portion and the second plate portion are different.

For example, if the first penetrating holes and second penetrating holes are formed such that the fluid resistance of the second plate portion is greater than the fluid resistance of the first plate portion, then when the fuel rocks, a flow amount of fuel flowing through the first penetrating holes in the first plate portion with the smaller fluid resistance to the opposite side of the first plate portion in plan view is greater than a flow amount of fuel flowing through the second penetrating holes in the second plate portion with the larger fluid resistance to the opposite side of the second plate portion. As a result, a flow of fuel rotating from the first plate portion toward the second plate portion around the strut in plan view (below referred to as a "rotary flow") is produced. Consequently, the fuel that passes through the first penetrating holes in the first plate portion and the second penetrating holes in the second plate portion of the separator during rocking of the fuel is inhibited from approaching the side walls of the fuel tank main body. Thus, the production of noise by rocking fuel impacting against the side walls of the fuel tank main body is further suppressed.

In a fuel tank according to a second aspect of the present disclosure, in the fuel tank of the first aspect, only the first penetrating hole in the first plate portion or the second penetrating hole in the second plate portion is formed.

In this fuel tank, the first penetrating holes or the second penetrating holes are formed in only one of the first plate portion and the second plate portion. For example, if the first penetrating holes are formed only in the first plate portion and no second penetrating holes are formed in the second plate portion, the fluid resistance of the first plate portion in which the first penetrating holes are formed is lower than the fluid resistance of the second plate portion in which no second penetrating holes are formed. Thus, when the fuel rocks, a rotary flow of the fuel from the first plate portion toward the second plate portion around the strut in plan view is caused by the fuel passing through the first penetrating holes in the first plate portion. As a result, flows of rocking fuel toward the side walls of the fuel tank main body via the first penetrating holes may be suppressed. Thus, the production of noise in the fuel tank main body may be further suppressed.

In a fuel tank according to a third aspect of the present disclosure, in the fuel tank of the first aspect, the first penetrating hole and the second penetrating hole are circular holes, and the first penetrating hole and the second penetrating hole differ in hole diameter.

In this fuel tank, the hole diameters of the circular holes differ between the first penetrating holes and the second penetrating holes. For example, if the hole diameters of the first penetrating holes are greater than the hole diameters of the second penetrating holes, the fluid resistance of the first plate portion is smaller than the fluid resistance of the second plate portion. Thus, when the fuel rocks, a fuel flow amount passing through the first penetrating holes in the first plate portion is greater than a fuel flow amount passing through the second penetrating holes in the second plate portion. As a result, a rotary flow of the fuel from the first plate portion toward the second plate portion around the strut in plan view occurs and flows of rocking fuel toward the side walls of the fuel tank main body via the first penetrating holes and second penetrating holes may be suppressed. Thus, the production of noise in the fuel tank main body may be further suppressed.

In a fuel tank according to a fourth aspect of the present disclosure, in the fuel tank of the first aspect, the first penetrating hole decreases in diameter from a face at one side of the first plate portion toward a face at another side thereof, and the second penetrating hole increases in diameter from a face at the one side of the second plate portion toward a face at the other side thereof.

In this fuel tank, the first penetrating holes are formed with decreasing diameters from the face at the one side of the first plate portion toward the face at the other side, and the second penetrating holes are formed with increasing diameters from the face at the one side of the second plate portion toward the face at the other side. In other words, directions of taper (directions of increasing diameter) of the first penetrating holes and the second penetrating holes are opposite directions. Therefore, when a direction of rocking fuel is the direction of decreasing diameter of the first penetrating holes (the direction of increasing diameter of the second penetrating holes), an inflow amount of fuel passing through the first penetrating holes in the first plate portion is larger (a flow speed thereof is higher) and a flow amount of fuel passing through the second penetrating holes is smaller (a flow speed thereof is lower). As a result, a rotary flow of the fuel from the first plate portion toward the second plate portion around the strut in plan view occurs and amounts of rocking fuel approaching the side walls of the fuel tank main body via the first penetrating holes and second penetrating holes may be suppressed. Thus, the production of noise in the fuel tank main body may be further suppressed.

In a fuel tank according to a fifth aspect of the present disclosure, in the fuel tank of any one of the first to fourth aspects, a strut penetrating hole is formed, the strut penetrating hole penetrating through the strut in a same direction as a direction of extension of the first penetrating hole and the second penetrating hole.

Because strut penetrating holes are formed penetrating through the strut in the same direction as the direction of extension of the first penetrating holes in the first plate portion and the second penetrating holes in the second plate portion, a flow of fuel passing through the separator is fragmented by passing through the first penetrating holes in the first plate portion and the second penetrating holes in the second plate portion and also passing through the strut penetrating holes. Thus, a flow speed (fluid energy) of the fuel that passes through is lowered further. As a result, the production of noise by rocking fuel impacting against the side walls of the fuel tank main body is even further suppressed.

A fuel tank according to a sixth aspect of the present disclosure includes: a fuel tank main body that is enclosed by a floor wall, side walls and an upper wall, and inside which fuel is stored; and a separator including a strut provided at at least one of the floor wall and the upper wall, a first plate portion that extends in a diametric direction from the strut, or a second plate portion that sandwiches the strut with the first plate portion and extends in a diametric direction at an opposite side of the strut from a side thereof at which the first plate portion is disposed, wherein a bending stiffness of the first plate portion is different from a bending stiffness of the second plate portion.

This fuel tank includes the separator that includes the first plate portion and the second plate portion that are provided to sandwich the strut from opposite sides of the strut. Because the first plate portion and the second plate portion have different bending stiffnesses, when fuel is rocking in the fuel tank main body, bending deformation amounts of the first plate portion and the second plate portion are different.

For example, if the bending stiffness of the second plate portion is higher than the bending stiffness of the first plate portion, then when the fuel rocks, a flow amount of fuel passing through the vicinity of the first plate portion whose bending deformation amount is relatively large is greater than a flow amount of fuel passing through the vicinity of the second plate portion. As a result, a flow of fuel from the first plate portion toward the second plate portion around the strut in plan view (a rotary flow) is produced.

Consequently, a flow amount of rocking fuel toward the side walls of the fuel tank main body is suppressed. Thus, the production of noise by rocking fuel impacting against the side walls of the fuel tank main body is suppressed.

In a fuel tank according to a seventh aspect of the present disclosure, in the fuel tank of the sixth aspect, a reinforcing rib is formed at at least one of the first plate portion or the second plate portion.

In this fuel tank, because the reinforcing rib is provided at the at least one of the first plate portion and the second plate portion, the bending stiffness of the one plate portion is set to be higher than the other plate portion.

For example, if the bending stiffness of the second plate portion is set to be higher than the bending stiffness of the first plate portion by a reinforcing rib being provided only at the second plate portion, then when the fuel rocks, a flow amount of fuel passing through the vicinity of the first plate portion whose bending deformation amount is relatively large is greater than a flow amount of fuel passing through the vicinity of the second plate portion. As a result, a flow of fuel from the first plate portion toward the second plate portion around the strut in plan view (a rotary flow) is produced. Consequently, a flow amount of rocking fuel toward the side walls of the fuel tank main body is suppressed. Thus, the production of noise by rocking fuel impacting against the side walls of the fuel tank main body is suppressed.

In a fuel tank according to an eighth aspect of the present disclosure, in the fuel tank of any one of the first to seventh aspects, the fuel tank main body includes a first storage portion, a second storage portion and a connecting portion, each of the first storage portion and the second storage portion being enclosed by a floor wall, side walls and an upper wall and the fuel being stored thereinside, and the connecting portion putting an upper portion of the first storage portion into fluid communication with an upper portion of the second storage portion, and respective separators are disposed in the first storage portion and the second storage portion.

in this saddle-shaped fuel tank, because the separators are provided in each of the pair of storage portions, the production of noise by fuel rocking in the storage portions impacting against the side walls of the storage portions may be suppressed effectively.

A fuel tank according to the first to eighth aspects of the present disclosure may further suppress the production of noise with the structures described above.

BRIEF DESCRIPTION OF THE DRAWINGS

Exemplary embodiments of the present disclosure will be described in detail based on the following figures, wherein:

FIG. 5A is a schematic explanatory plan view showing a noise production suppression operation of the separator according to the exemplary embodiment of the present disclosure, which is a diagram showing an initial time of fuel rocking toward the vehicle front;

FIG. 5B is a schematic explanatory plan view showing the noise production suppression operation of the separator according to the exemplary embodiment of the present disclosure, which is a diagram showing a time after a predetermined duration has passed from the initial time of the fuel rocking toward the vehicle front;

DETAILED DESCRIPTION

First Exemplary Embodiment

Figure 1:
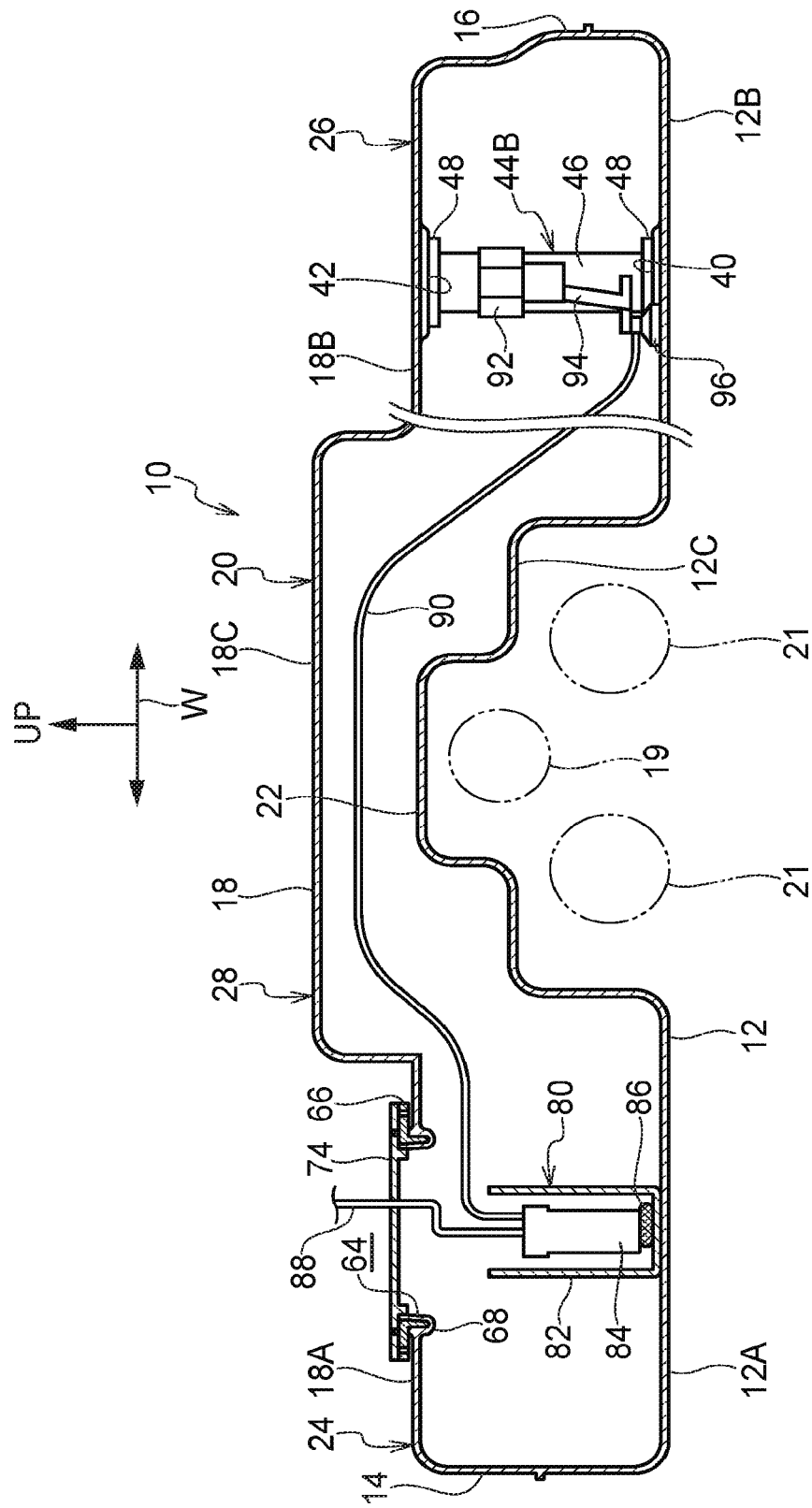
FIG. 1 is a sectional view cut along line A-A in FIG. 2.

A fuel tank according to a first exemplary embodiment of the present disclosure is described with reference to FIG. 1 to FIG. 8. In the following descriptions, the arrow FR in the drawings indicates the vehicle front, the arrow UP indicates the vehicle upper side, and the arrow W indicates the vehicle width direction.

Structures

First, overall structure of a fuel tank 10 is described with reference to FIG. 1. The fuel tank 10 includes a fuel tank main body 20 that is provided with a floor wall 12, a left wall 14, a right wall 16 and an upper wall 18. The floor wall 12 extends in the vehicle width direction. The left wall 14 and right wall 16 extend to the vehicle upper side from two vehicle width direction end portions of the floor wall 12. The upper wall 18 extends in the vehicle width direction, linking between upper ends of the left wall 14 and right wall 16. The fuel tank main body 20 is closed up by the floor wall 12, side walls including the left wall 14 and right wall 16, and the upper wall 18. The fuel tank main body 20 is capable of storing fuel thereinside.

A vehicle width direction central portion of the floor wall 12 includes a bump portion 22 that is recessed toward the vehicle upper side in order to avoid a driveshaft 19 and exhaust pipe 21 of the vehicle. That is, the fuel tank 10 is a "saddle-shaped" fuel tank. The fuel tank 10 is a resin fuel tank formed of resin. The driveshaft 19 and exhaust pipe 21 are shown only in FIG. 1 and are not shown in the other drawings.

The interior of the fuel tank main body 20 is divided into a first storage portion 24 disposed at the vehicle width direction left side relative to the bump portion 22, a second storage portion 26 disposed at the vehicle width direction right side, and a connecting portion 28. The connecting portion 28 connects (puts into fluid communication) upper portions of the first storage portion 24 and second storage portion 26 with one another.

Portions of the floor wall 12 and upper wall 18 that structure the first storage portion 24 are referred to as, respectively, a first floor wall portion 12A and a first upper wall portion 18A. Portions of the floor wall 12 and upper wall 18 that structure the second storage portion 26 are referred to as, respectively, a second floor wall portion 12B and a second upper wall portion 18B. Portions of the floor wall 12 and upper wall 18 that structure the connecting portion 28 are referred to as, respectively, a third floor wall portion 12C and a third upper wall portion 18C.

Figure 2:
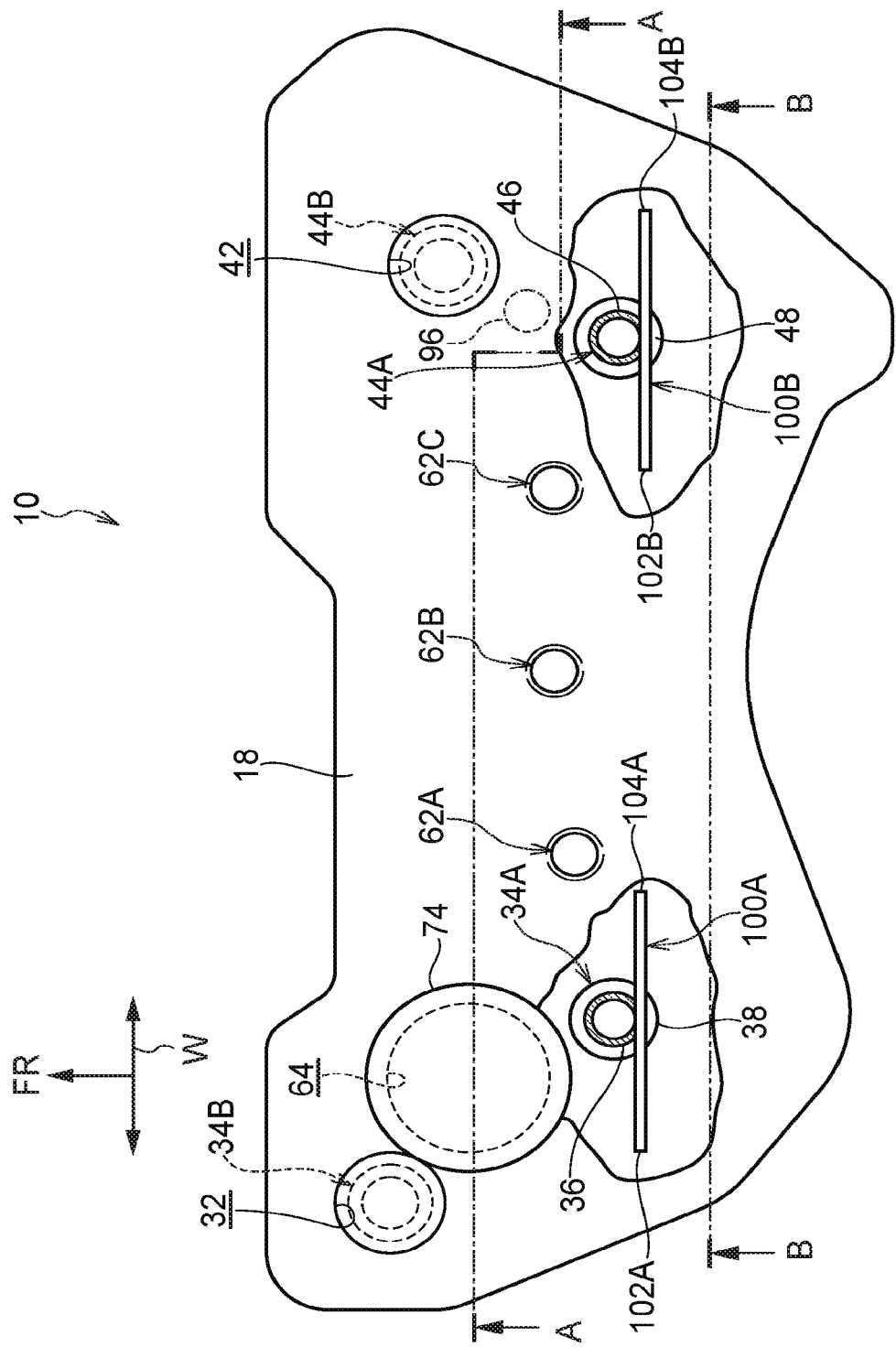
FIG. 2 is a plan view of a fuel tank according to a first exemplary embodiment of the present disclosure.

As shown in FIG. 2, a strut 34A and a strut 34B are disposed in the first storage portion 24 to extend in the vehicle vertical direction. The strut 34A and strut 34B are disposed to sandwich an attachment hole portion 64, which is described below, from, respectively, a vehicle rear side and a vehicle front side thereof.

Figure 3:
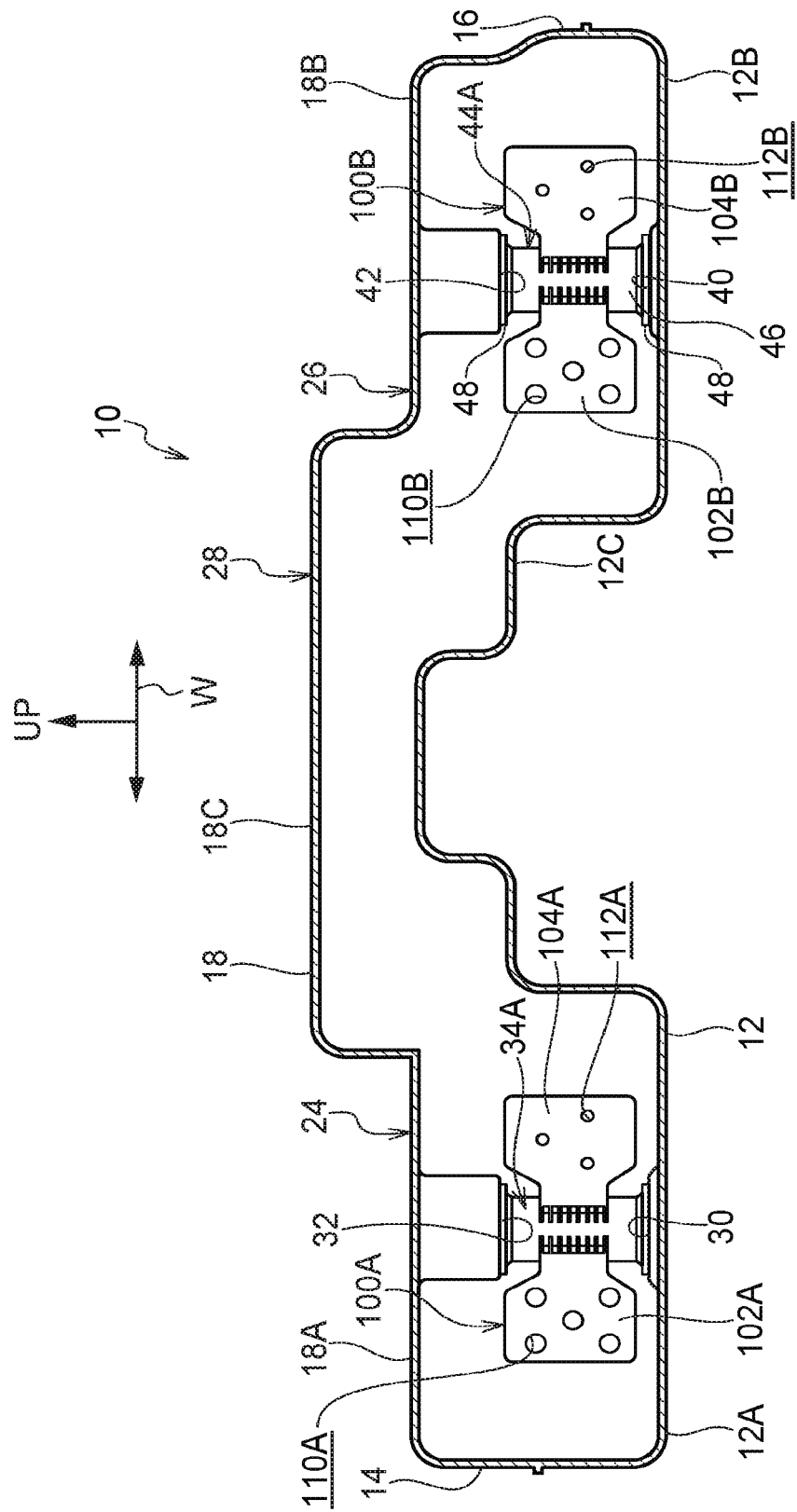
FIG. 3 is a sectional view cut along line B-B in FIG. 2.

As shown in FIG. 3, an attachment portion 30 that protrudes toward the vehicle upper side is formed at a strut arrangement position of the first floor wall portion 12A, and an attachment portion 32 that protrudes toward the vehicle lower side is formed at a strut arrangement position of the first upper wall portion 18A. The strut 34A extending in the vehicle vertical direction is disposed between the attachment portions 30 and 32.

Figure 4:
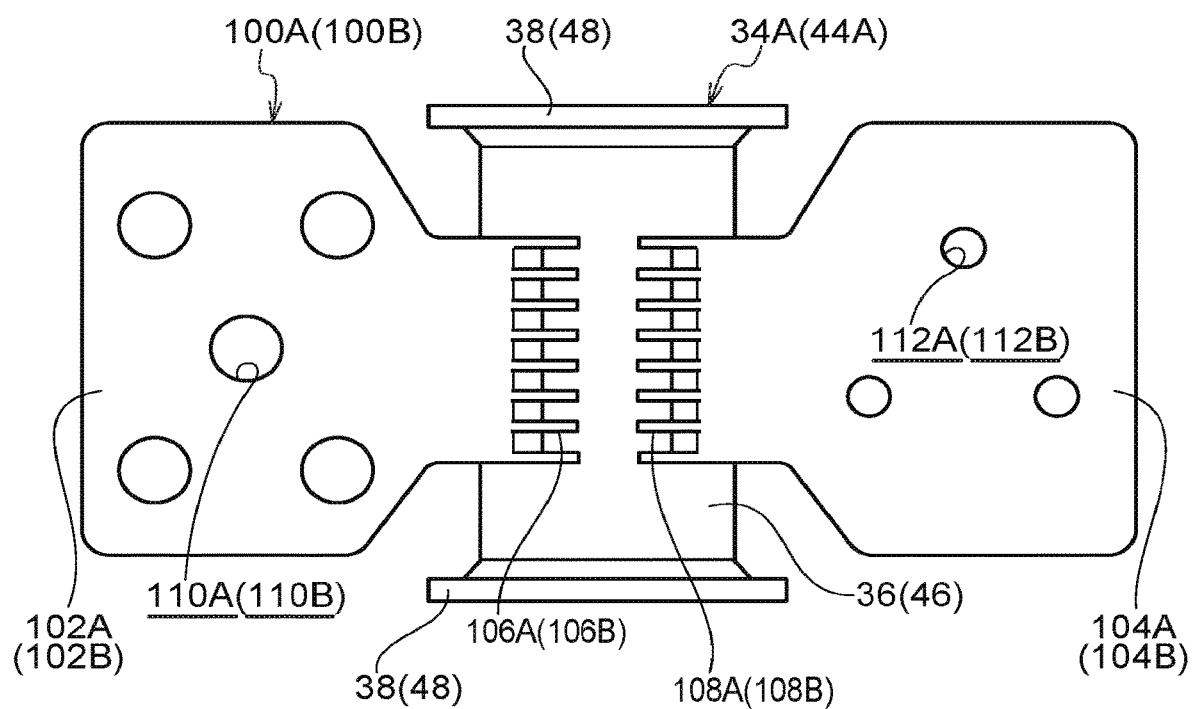
FIG. 4 is a front view of a separator according to the first exemplary embodiment of the present disclosure.

As shown in FIG. 4, the strut 34A includes a strut main body 36 in a substantially circular tube shape and flange portions 38, which are formed to protrude to diametric direction outer sides at both of end portions of the strut main body 36. The strut 34A is disposed between the first upper wall portion 18A and the first floor wall portion 12A by the flange portions 38 being joined to the corresponding attachment portions 32 and 30.

A separator 100A is provided at the strut 34A. As shown in FIG. 3 and FIG. 4, the separator 100A includes a first plate portion 102A and a second plate portion 104A. The first plate portion 102A is provided to extend to the vehicle width direction outer side from the strut 34A. The second plate portion 104A is provided to extend to the vehicle width direction inner side from the strut 34A. As shown in FIG. 4, the first plate portion 102A and second plate portion 104A are connected to the vehicle rear side of an outer periphery surface of the strut 34A via, respectively, ribs 106A and ribs 108A. That is, the first plate portion 102A and second plate portion 104A are provided to sandwich the strut 34A with left-right symmetry in the vehicle width direction. Here, the first plate portion 102A and second plate portion 104A are formed integrally with the strut 34A.

The first plate portion 102A and second plate portion 104A are formed with the same areas and shapes, except for being left-right symmetrical and including first penetrating holes 110A and second penetrating holes 112A, which are described below.

Five of the first penetrating holes 110A are formed in the first plate portion 102A, extending in the vehicle front-and-rear direction (the plate thickness direction). Three of the second penetrating holes 112A are formed in the second plate portion 104A, extending in the vehicle front-and-rear direction (the plate thickness direction). Diameters of the second penetrating holes 112A are set to be smaller than diameters of the first penetrating holes 110A. Thus, a cross-sectional area of the second penetrating holes 112A is set to be smaller than a cross-sectional area of the first penetrating holes 110A.

The strut 34B has a similar structure to the strut 34A, except for no separator being provided thereat.

Similarly to the first storage portion 24, as shown in FIG. 2, a pair of struts 44A and 44B that extend in the vehicle vertical direction are disposed in the second storage portion 26. As shown in FIG. 3, the strut 44A, similarly to the strut 34A, includes a strut main body 46 in a substantially circular tube shape and flange portions 48 that are formed to protrude to diametric direction outer sides at both of end portions of the strut main body 46. The strut 44A is disposed between the second upper wall portion 18B and second floor wall portion 12B by the flange portions 48 being joined to, respectively, attachment portions 42 and 40.

A separator 100B is provided at the strut 44A. The separator 100B has substantially the same structure as the separator 100A. Therefore, reference symbols the same as the reference symbols of structural members of the separator 100A are assigned, with the suffix "B", and detailed descriptions are not given here (see FIG. 3 and FIG. 4).

The strut 44B disposed at the vehicle front side of the strut 44A has a similar structure to the strut 44A, except for no separator being provided.

As shown in FIG. 2, stand-offs 62A, 62B and 62C are formed in the connecting portion 28. At the stand-offs 62A to 62C, truncated cone-shaped projection portions that are formed to project toward the vehicle upper side from the third floor wall portion 12C are joined to truncated cone-shaped projection portions that are formed to project toward the vehicle lower side from the third upper wall portion 18C. Thus, the three stand-offs 62A to 62C are formed in the connecting portion 28 at predetermined spacings in the vehicle width direction.

As shown in FIG. 1, the attachment hole portion 64 is formed in the first upper wall portion 18A of the first storage portion 24 for attachment of internal components of the fuel tank 10 to the interior of the fuel tank main body 20.

The attachment hole portion 64 is formed a little to the vehicle front side of the middle of the first upper wall portion 18A. As shown in FIG. 1, the attachment hole portion 64 includes a circular tube-shaped support portion 68 and an insert ring 66 fabricated of metal, which is insert-molded in the support portion 68.

As shown in FIG. 1, the attachment hole portion 64 is closed off by a lid body 74 being placed on the insert ring 66 and fastened to the insert ring 66 by a metal fixture that is not shown in the drawings.

As shown in FIG. 1, a pump module 80 is disposed in the first storage portion 24 below the attachment hole portion 64.

The pump module 80 is provided with a fuel pump 84 and a filter 86 inside a sub-cap 82. The fuel pump 84 supplies fuel to outside the fuel tank main body 20. The filter 86 removes foreign substances from fuel that is sucked into the fuel pump 84. A fuel supply tube 88 of the pump module 80 supplies fuel to outside the fuel tank main body 20. The fuel supply tube 88 extends from the fuel pump 84 to the outside, penetrating through the lid body 74.

A jet pump, which is not shown in the drawings, is provided inside the pump module 80. The jet pump is for sucking fuel from the second storage portion 26 side through a fuel transfer pipe 90. An end portion of the fuel transfer pipe 90 is connected to the jet pump.

As shown in FIG. 1, a bracket 92 is attached to the strut 44B at the vehicle front side of the second storage portion 26. A filter portion 96 is disposed at a distal end of an arm 94 that extends toward the second floor wall portion 12B from the bracket 92. One end of the fuel transfer pipe 90 for supplying fuel from the second storage portion 26 to the pump module 80 in the first storage portion 24 is connected to the filter portion 96. As shown in FIG. 2, the filter portion 96 is disposed on the second floor wall portion 12B of the second storage portion 26 between the pair of struts 44A and 44B.

As shown in FIG. 1, the fuel transfer pipe 90 connects (puts into fluid communication) the filter portion 96 with the pump module 80 (the jet pump).

Operation

First, operation of the fuel tank 10 according to the first exemplary embodiment is described. The separator 100A and the separator 100B have similar operational effects. Therefore, only the separator 100A is described and descriptions of the separator 100B are not given.

In the fuel tank 10, because the separator 100A is disposed in the first storage portion 24, rocking of fuel toward the vehicle front side in the first storage portion 24, for example, during deceleration or the like is suppressed by the first plate portion 102A and the second plate portion 104A. As a result, the production of noise by the rocking fuel impacting against the side walls of the fuel tank main body 20 is suppressed.

Although the first plate portion 102A and the second plate portion 104A have the same shapes (and same areas) with left-right symmetry, five of the first penetrating holes 110A are formed in the first plate portion 102A and three of the second penetrating holes 112A are formed in the second plate portion 104A. In addition, the diameters of the first penetrating holes 110A are larger than the diameters of the second penetrating holes 112A. Thus, a fluid resistance of the second plate portion 104A is set to be greater than a fluid resistance of the first plate portion 102A.

Therefore, as is schematically shown in FIG. 5A, a flow amount of rocking fuel passing through the first penetrating holes 110A in the first plate portion 102A (see arrow P) of the separator 100A is greater than a flow amount of rocking fuel passing through the second penetrating holes 112A in the second plate portion 104A (see arrow Q).

As a result, a flow of fuel rotating from the first plate portion 102A toward the second plate portion 104A around the strut 34A in plan view (below referred to as a "rotary flow") occurs (see arrow R in FIG. 5B).

Consequently, a large proportion of the rocking fuel passing through the first penetrating holes 110A in the first plate portion 102A and the second penetrating holes 112A in the second plate portion 104A does not impact against the side walls of the fuel tank main body 20. That is, only a portion of the rocking fuel passing through the first penetrating holes 110A and the second penetrating holes 112A impacts against the side walls of the fuel tank main body 20. As a result, the production of noise in the fuel tank 10 is even further suppressed.

As shown in FIG. 5B, this rotary flow reaches the second plate portion 104A in the opposite direction (toward the vehicle rear) to the rocking direction of the fuel (toward the vehicle front). Therefore, deformation of the separator 100A (the second plate portion 104A) by the rocking of the fuel may be suppressed.

The separator 100A is formed by the first plate portion 102A and the second plate portion 104A being provided at the strut 34A, and the strut 34A is connected with the first upper wall portion 18A and the first floor wall portion 12A. Thus, deformation of the fuel tank 10 fabricated of resin, particularly of the first upper wall portion 18A and the first floor wall portion 12A, is suppressed. In other words, because the first plate portion 102A and second plate portion 104A of the separator 100A are provided at the strut 34A that suppresses deformation, a number of components may be reduced.

Because the first storage portion 24 and the second storage portion 26 are divided apart in the saddle-shaped fuel tank 10, when a remaining fuel amount is small, the fuel rocks separately in the first storage portion 24 and the second storage portion 26. Because the separators 100A and 100B are provided in, respectively, the first storage portion 24 and the second storage portion 26 of the fuel tank 10, rocking of fuel is suppressed in each of the first storage portion 24 and the second storage portion 26. Moreover, rotary flows around the struts 34A and 44A in plan view are caused by fuel passing through the first penetrating holes 110A and 110B and the second penetrating holes 112A and 112B, and impacts of fuel against the side walls of the fuel tank main body 20 may be suppressed. Thus, the production of noise in the fuel tank 10 may be suppressed effectively.

Variations

In the present exemplary embodiment, a difference in fuel flow amounts passing through the first penetrating holes 110A and second penetrating holes 112A in the first plate portion 102A and second plate portion 104A of the separator 100A is produced by varying the numbers and diameters (sizes) of the first penetrating holes 110A and the second penetrating holes 112A. However, this is not limiting.

Figure 6:
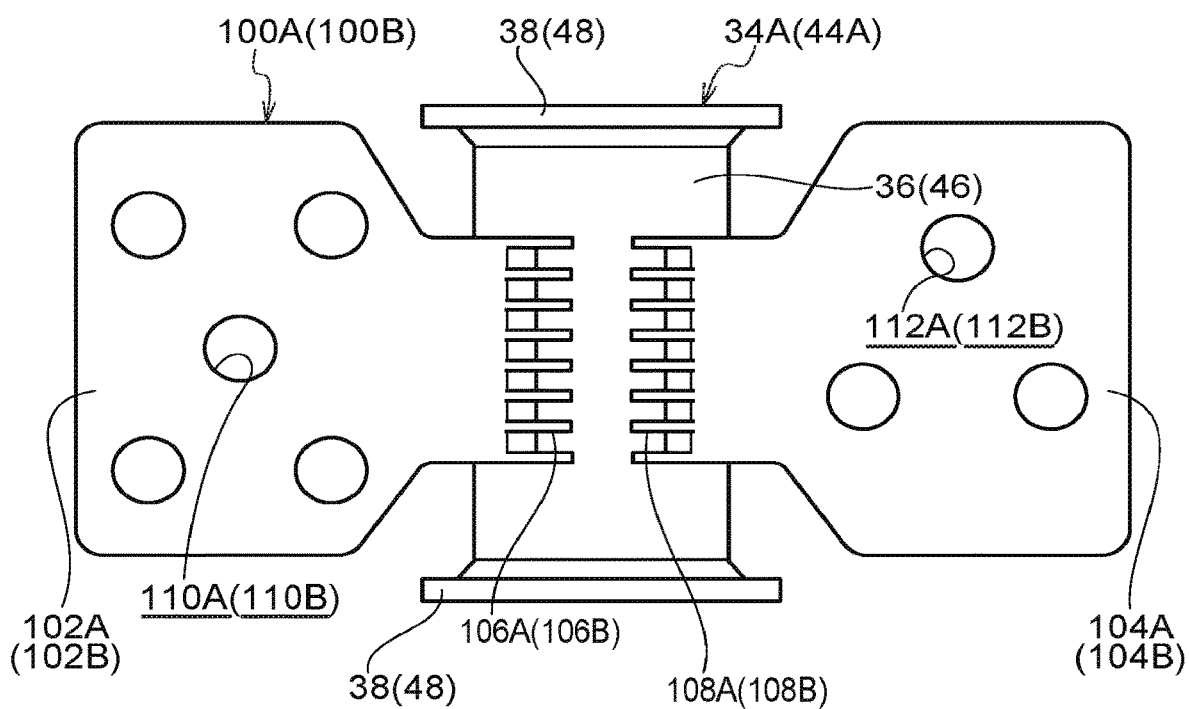
FIG. 6 is a front view of a separator according to a variation of the first exemplary embodiment of the present disclosure.
Figure 7:
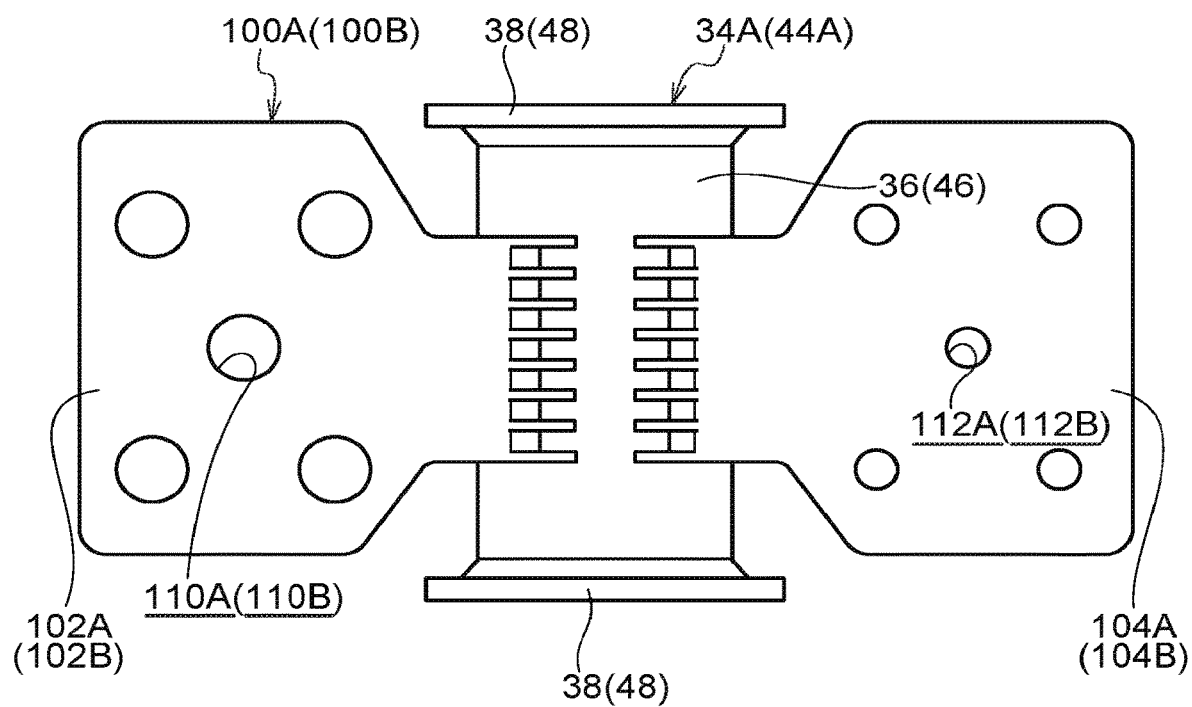
FIG. 7 is a front view of a separator according to another variation of the first exemplary embodiment of the present disclosure.

For example, as shown in FIG. 6, it may be that the numbers of the first penetrating holes 110A and the second penetrating holes 112A are different but the diameters are the same. Alternatively, as shown in FIG. 7, it may be that the diameters of the first penetrating holes 110A and the second penetrating holes 112A are different but the numbers are the same.

In these structures too, a fuel flow amount passing through the first penetrating holes 110A is larger than a fuel flow amount passing through the second penetrating holes 112A, and the production of noise may be further suppressed by a rotary flow being caused around the strut 34A in plan view.

Figure 8:
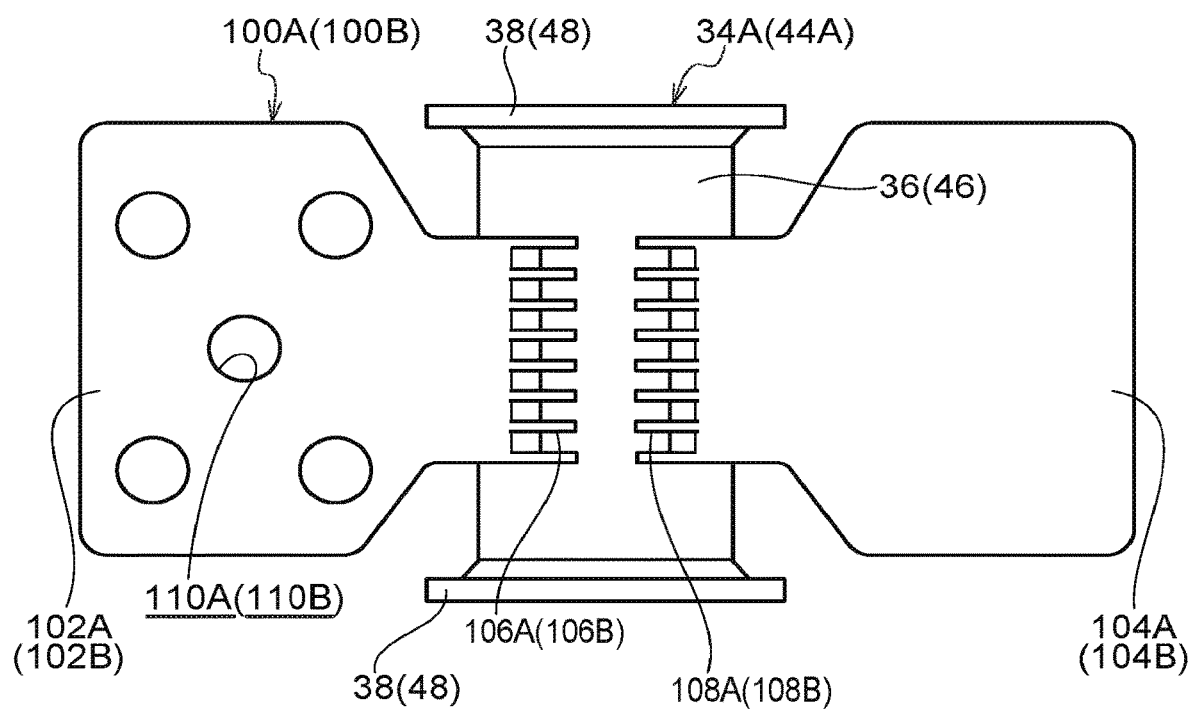
FIG. 8 is a front view of a separator according to still another variation of the first exemplary embodiment of the present disclosure.

Further, at least one of the numbers and diameters of the first penetrating holes 110A and the second penetrating holes 112A being different encompasses the number or diameter of the first penetrating holes 110A or the second penetrating holes 112A being zero. For example, as shown in FIG. 8, this encompasses the first penetrating holes 110A being formed in the first plate portion 102A but no second penetrating holes being formed in the second plate portion 104A. In this case too, fuel only passes through the first penetrating holes 110A at the first plate portion 102A side and flows to the vehicle front side, a rotary flow around the strut 34A in plan view is caused, and the production of noise may be further suppressed.

Second Exemplary Embodiment

A fuel tank according to a second exemplary embodiment of the present disclosure is described with reference to FIG. 9 to FIG. 11. Structural elements that are similar to the first exemplary embodiment are assigned the same reference symbols and are not described in detail. Only the shape of the separator differs from the first exemplary embodiment. Accordingly, only corresponding portions are described.

Structures

In a fuel tank according to the second exemplary embodiment (not shown in the drawings), the separators 100A and 100B of the fuel tank 10 according to the first exemplary embodiment are replaced with separators 200A and 200B, which are described below.

Operational effects of the separator 200A and the separator 200B are similar. Therefore, only the separator 200A is described and descriptions of the separator 200B are not given.

Figure 9:
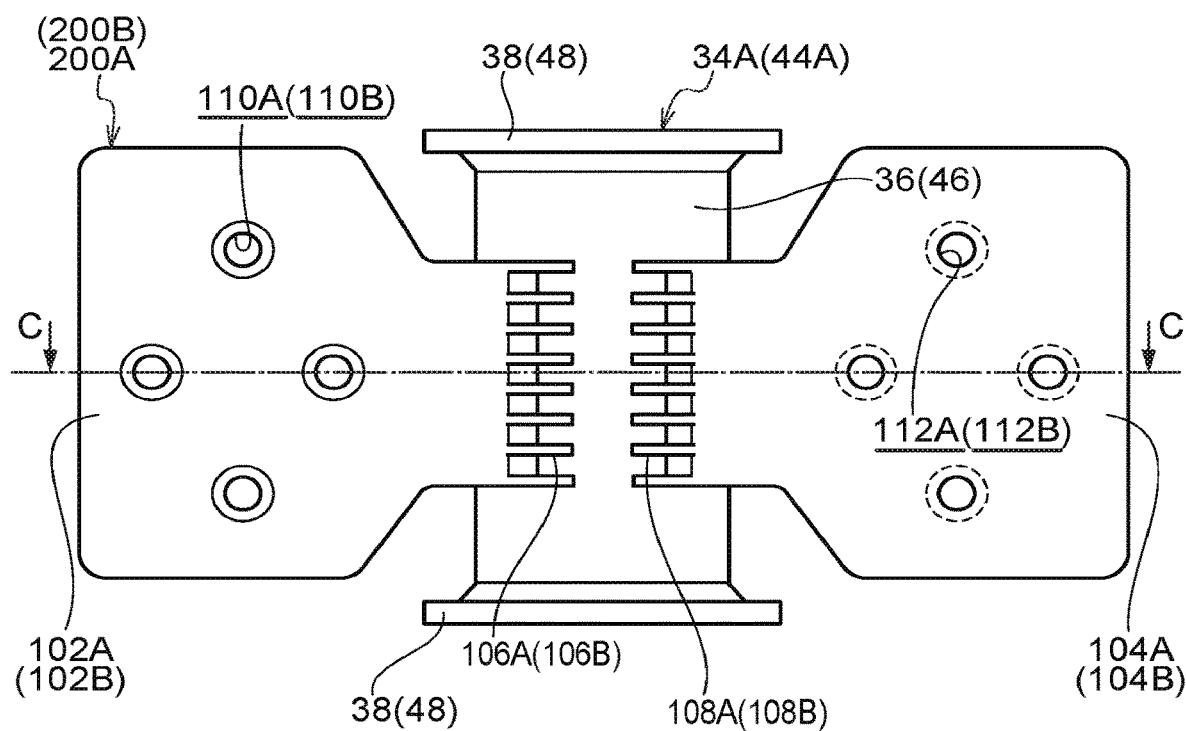
FIG. 9 is a front view of a separator according to a second exemplary embodiment of the present disclosure.

As shown in FIG. 9, four each of the first penetrating holes 110A and the second penetrating holes 112A are formed in, respectively, the first plate portion 102A and the second plate portion 104A of the separator 200A.

Figure 10:
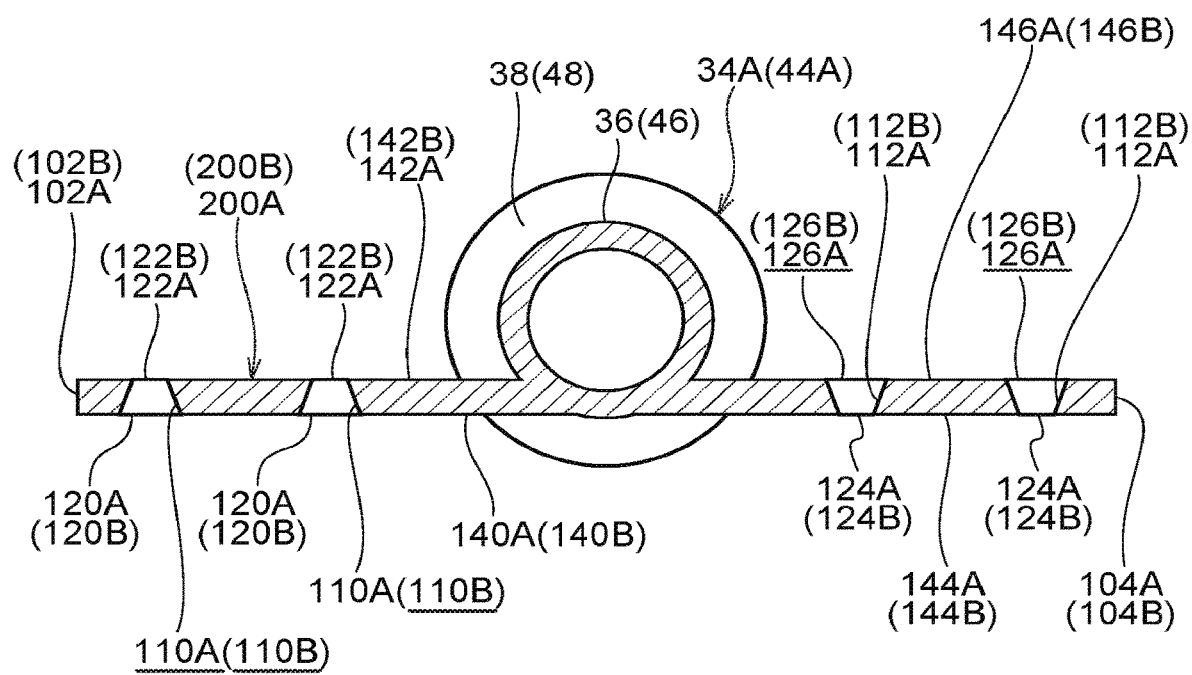
FIG. 10 is a sectional view cut along line C-C in FIG. 9.

As shown in FIG. 10, the first penetrating holes 110A are formed in tapered shapes that decrease in diameter toward the vehicle front, such that vehicle rear side end portions of the first penetrating holes 110A that open in a first face 140A at the vehicle rear side of the first plate portion 102A are large diameter portions 120A and vehicle front side end portions of the first penetrating holes 110A that open in a second face 142A at the vehicle front side of the first plate portion 102A are small diameter portions 122A.

Meanwhile, the second penetrating holes 112A are formed in tapered shapes that increase in diameter toward the vehicle front, such that vehicle rear side end portions of the second penetrating holes 112A that open in a first face 144A at the vehicle rear side of the second plate portion 104A are small diameter portions 124A and vehicle front side end portions of the second penetrating holes 112A that open in a second face 146A at the vehicle front side of the second plate portion 104A are large diameter portions 126A.

That is, the first penetrating holes 110A and second penetrating holes 112A are formed in tapered shapes that are the same shapes but tapered in opposite directions.

Operation

When fuel inside the fuel tank main body 20 rocks toward the vehicle front due to the vehicle decelerating, rocking of the fuel in the first storage portion 24 is suppressed by the first plate portion 102A and second plate portion 104A of the separator 200A, and the production of noise is suppressed.

Figure 11:
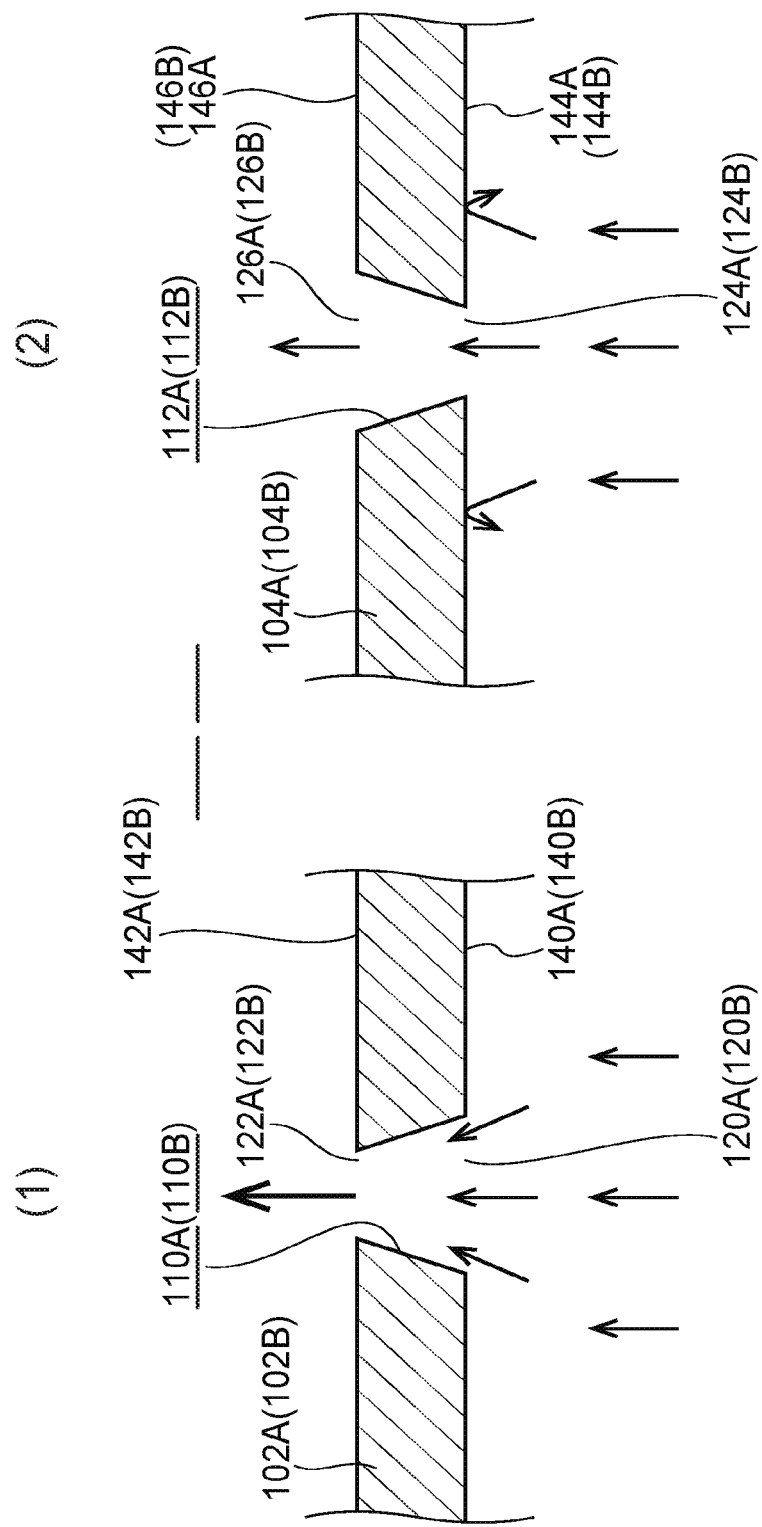
FIG. 11 is a schematic sectional enlarged diagram showing flow states at a separator according to a third exemplary embodiment of the present disclosure, in which (1) is a diagram showing a first penetrating hole and (2) is a diagram showing a second penetrating hole.

As shown in (1) of FIG. 11, because the vehicle rear side end portions of the first penetrating holes 110A of the first plate portion 102A are formed as the large diameter portions 120A, large amounts of fuel flow into the first penetrating holes 110A, and because the diameters decrease toward the vehicle front, the fuel is ejected from the first penetrating holes 110A with a raised flow speed.

In contrast, as shown in (2) of FIG. 11, because the vehicle rear side end portions of the second penetrating holes 112A of the second plate portion 104A are formed as the small diameter portions 124A with smaller diameters than the large diameter portions 120A, smaller amounts of fuel flow into the second penetrating holes 112A, and because the diameters of the second penetrating holes 112A increase toward the vehicle front, the flow speed of the fuel is lowered.

Therefore, as is schematically shown in FIG. 5A, a flow amount of rocking fuel passing through the first penetrating holes 110A in the first plate portion 102A (see arrow P) of the separator 100A is greater than a flow amount of rocking fuel passing through the second penetrating holes 112A in the second plate portion 104A (see arrow Q).

As a result, a rotary flow of fuel rotating from the first plate portion 102A toward the second plate portion 104A around the strut 34A in plan view occurs (see arrow R in FIG. 5B).

Consequently, a large proportion of the rocking fuel passing through the first penetrating holes 110A in the first plate portion 102A and the second penetrating holes 112A in the second plate portion 104A does not impact against the side walls of the fuel tank main body 20. That is, only a portion of the rocking fuel passing through the first penetrating holes 110A and the second penetrating holes 112A impacts against the side walls of the fuel tank main body 20. As a result, the production of noise in the fuel tank 10 is even further suppressed.

Variations

In the separator 200A according to the present exemplary embodiment too, the numbers and diameters (sizes) of the first penetrating holes 110A and second penetrating holes 112A in the first plate portion 102A and second plate portion 104A may be varied. That is, the number of the first penetrating holes 110A may be made greater than the number of the second penetrating holes 112A, the diameters of the first penetrating holes 110A may be made greater than the diameters of the second penetrating holes 112A, or the like.

Third Exemplary Embodiment

A fuel tank according to a third exemplary embodiment of the present disclosure is described with reference to FIG. 12 and FIG. 13. Structural elements that are similar to the first exemplary embodiment are assigned the same reference symbols and are not described in detail. Only the shape of the separator differs from the first exemplary embodiment. Accordingly, only corresponding portions are described.

Structures

In a fuel tank according to the third exemplary embodiment (not shown in the drawings), the separators 100A and 100B of the fuel tank 10 of the first exemplary embodiment are replaced with separators 300A and 300B, which are described below.

The separator 300A and the separator 300B have similar operational effects. Therefore, only the separator 300A is described and descriptions of the separator 300B are not given.

Figure 12:
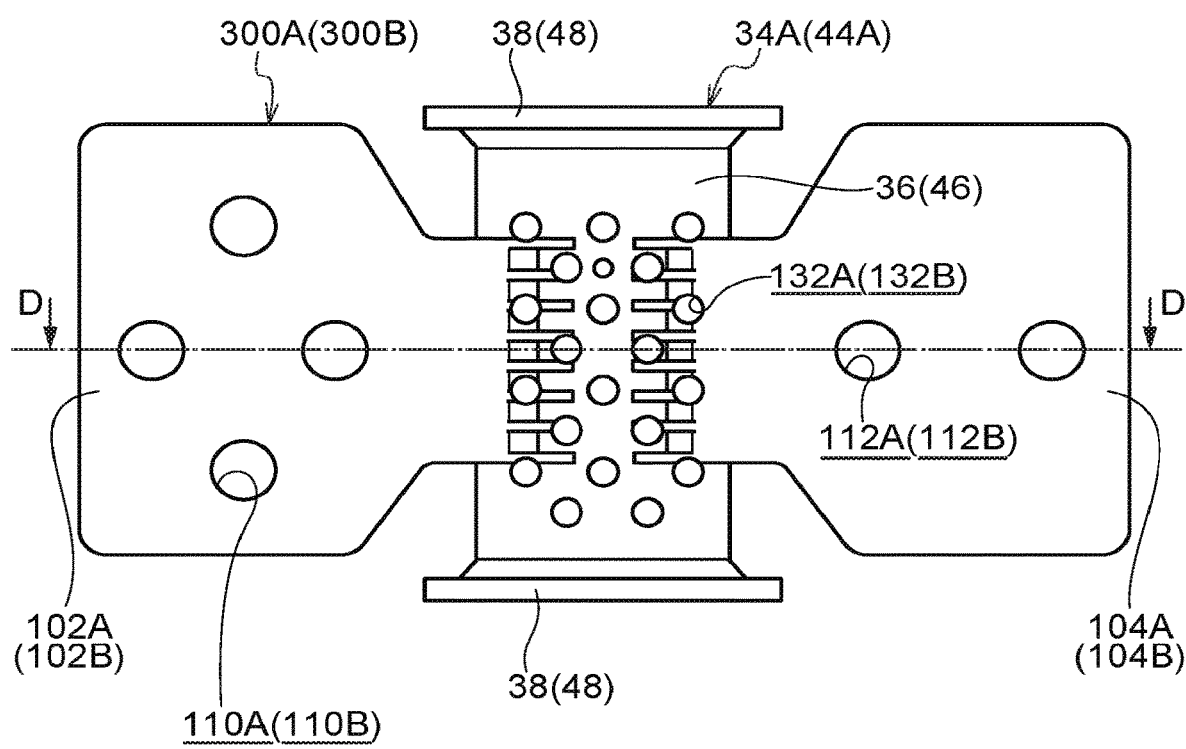
FIG. 12 is a front view of the separator according to the third exemplary embodiment of the present disclosure.

As shown in FIG. 12, four of the first penetrating holes 110A are formed in the first plate portion 102A and two of the second penetrating holes 112A are formed in the second plate portion 104A of the separator 300A. The first penetrating holes 110A and the second penetrating holes 112A have the same diameters (and the same shapes).

Figure 13:
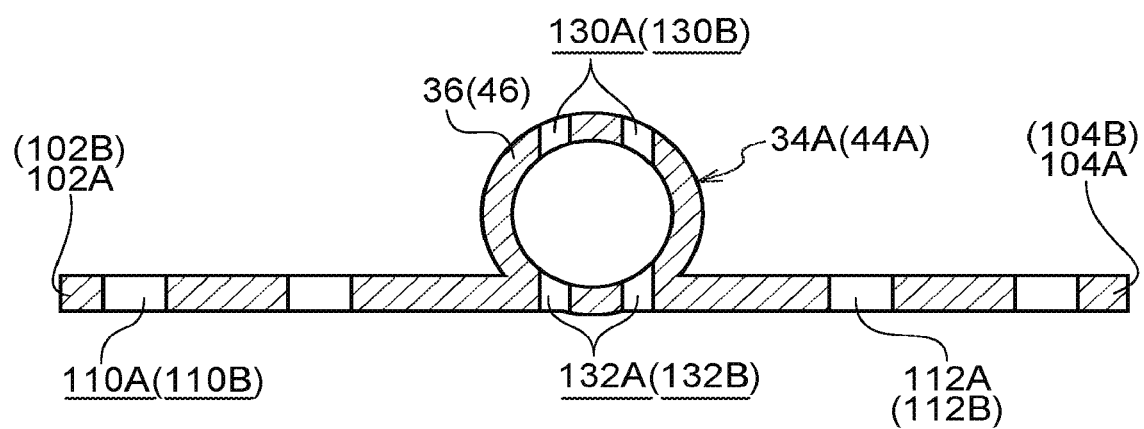
FIG. 13 is a sectional view cut along line D-D in FIG. 12.

As shown in FIG. 13, the strut main body 36 of the strut 34A has a substantially circular tube shape. Plural hole portions 130A are formed in the vehicle front side of an outer periphery wall of the strut main body 36, and plural hole portions 132A are formed in the vehicle rear side of the outer periphery wall.

The hole portions 130A and 132A are formed at positions that match up in the vehicle width direction and the vehicle vertical direction. The pairs of hole portions 130A and 132A are formed as strut penetrating holes that penetrate through the strut.

Operation

At the separator 300A, when fuel in the fuel tank rocks toward the vehicle front due to a deceleration of the vehicle, rocking of the fuel in the first storage portion 24 is suppressed by the first plate portion 102A and the second plate portion 104A. As a result, the production of noise by the rocking fuel impacting against the side walls of the fuel tank main body 20 is suppressed.

In the first plate portion 102A and the second plate portion 104A, the number of the first penetrating holes 110A is greater than the number of the second penetrating holes 112A with the same diameter (the same shape and the same size). Therefore, a flow amount of fuel passing through the first penetrating holes 110A and flowing toward the vehicle front side is greater than a flow amount of fuel passing through the second penetrating holes 112A, and a rotary flow of fuel around the strut 34A in plan view is caused. Consequently, fuel impacting against the side walls of the fuel tank main body 20 may be reduced and the production of noise may be further suppressed.

Furthermore, in the separator 300A, because the hole portions 130A and 132A are formed in the strut main body 36 of the strut 34A, strut penetrating holes are formed that extend in the vehicle front-and-rear direction through the interior of the strut main body 36 (a cylindrical cavity portion). Thus, fuel reaching the separator 300A due to rocking from the vehicle rear passes through the hole portions 130A and 132A as well as the first penetrating holes 110A and the second penetrating holes 112A, and moves toward the vehicle front side. Therefore, the flow of fuel passing through the separator 300A is fragmented and fluid energy (a flow speed) of fuel passing through the separator 300A is further reduced. Consequently, fuel that passes through the separator 300A is inhibited from impacting against the side walls of the fuel tank main body 20 and the production of noise is suppressed even further.

Fourth Exemplary Embodiment

A fuel tank according to a fourth exemplary embodiment of the present disclosure is described with reference to FIG. 14A and FIG. 14B. Structural elements that are similar to the first exemplary embodiment are assigned the same reference symbols and are not described in detail. Only the shape of the separator differs from the first exemplary embodiment. Accordingly, only corresponding portions are described.

Structures

In a fuel tank according to the fourth exemplary embodiment (not shown in the drawings), the separators 100A and 100B of the fuel tank 10 of the first exemplary embodiment are replaced with separators 400A and 400B, which are described below.

The separator 400A and the separator 400B have similar operational effects. Therefore, only the separator 400A is described and descriptions of the separator 400B are not given.

Figure 14A:
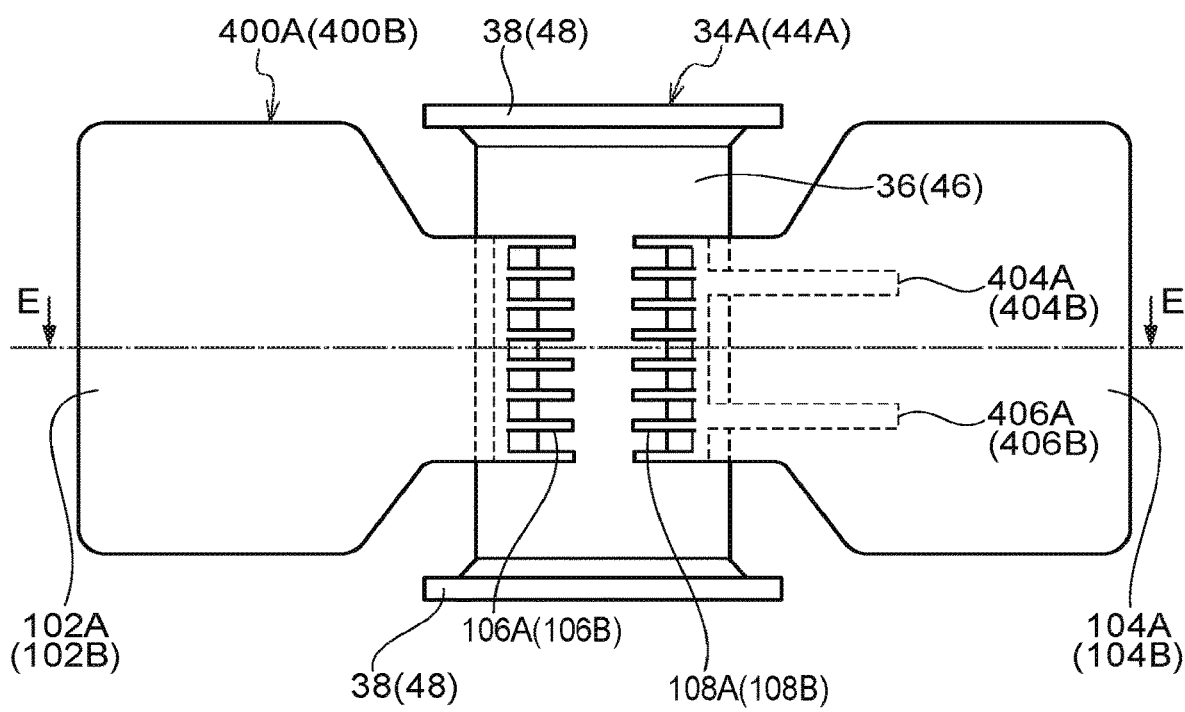
FIG. 14A is a front view of a separator according to a fourth exemplary embodiment of the present disclosure.
Figure 14B:
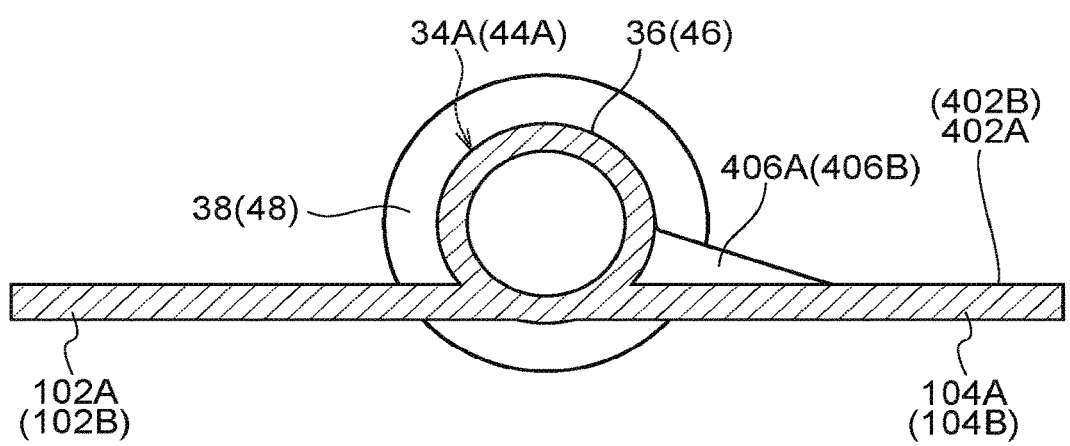
FIG. 14B is a sectional view cut along line E-E in FIG. 14A.

As shown in FIG. 14A and FIG. 14B, reinforcing ribs 404A and 406A are provided extending from the strut main body 36 of the strut 34A to a vehicle front side face 402A of the second plate portion 104A of the separator 400A. The reinforcing ribs 404A and 406A have triangular shapes in plan view and are separated by a predetermined spacing in the vehicle vertical direction.

Operation

In the separator 400A with the structure described above, because the reinforcing ribs 404A and 406A are provided only at the second plate portion 104A, a bending stiffness of the second plate portion 104A is higher than a bending stiffness of the first plate portion 102A.

When the fuel in the fuel tank main body 20 rocks toward the vehicle front during a deceleration of the vehicle or the like, the first plate portion 102A that is being pushed by the fuel rocking toward the vehicle front bends toward the vehicle front side more than the second plate portion 104A.

As a result, as shown in FIG. 5A, a flow amount of fuel flowing toward the vehicle front side in the vicinity of the first plate portion 102A is greater than a flow amount of fuel flowing toward the vehicle front side in the vicinity of the second plate portion 104A. Therefore, as shown in FIG. 5B, a flow of fuel from the first plate portion 102A toward the second plate portion 104A around the strut 34A in plan view (a rotary flow) occurs, and an amount of the fuel rocking toward the vehicle front side that impacts against the side walls of the fuel tank main body 20 is suppressed. Consequently, the production of noise is further suppressed.

The separator 200B provides the same operational effects as the separator 200A.

Variations

In the present exemplary embodiment, the reinforcing ribs 404A and 406A are provided only at the second plate portion 104A. However, reinforcing ribs may also be provided at the first plate portion 102A. In this case too, the same operational effects are provided as long as the bending stiffnesses of the first plate portion 102A and the second plate portion 104A are made different, by the number of reinforcing ribs being made different or the like.

The bending stiffnesses of the first plate portion 102A and the second plate portion 104A may be made different by means other than reinforcing ribs. For example, it may be that the bending stiffnesses are made different by the shapes of the first plate portion 102A and the second plate portion 104A being made different.

Alternatives

In the fuel tank 10 according to these exemplary embodiments, the separators 100A, 100B, 200A, 200B, 300A, 300B, 400A and 400B (below referred to as the separators 100A to 400B) are provided at the strut 34A in the first storage portion 24 and the strut 44A in the second storage portion 26, but this is not limiting. The separators 100A to 400B may be provided at the struts 34B and 44B. Further, the separators 100A to 400B may be provided at the pairs of struts 34A, 34B, 44A and 44B.

In these exemplary embodiments, structures are described in which the first plate portions 102A and 102B and second plate portions 104A and 104B of the separators 100A to 400B are formed integrally with the strut main bodies 36 and 46, but this is not limiting. That is, the separators 100A to 400B may be structured by the first plate portions 102A and 102B and second plate portions 104A and 104B being attached to the strut main bodies 36 and 46 via brackets.

In these exemplary embodiments, the first plate portions 102A and 102B and second plate portions 104A and 104B are formed with left-right symmetry about the separators 100A to 400B, but this is not limiting. For example, non-symmetry between left and right is possible, with the areas of the second plate portions 104A and 104B being formed to be larger than the areas of the first plate portions 102A and 102B.

In these exemplary embodiments, the first plate portions 102A and 102B and second plate portions 104A and 104B of the separators 100A to 400B extend in the vehicle width direction sandwiching the strut main bodies 36 and 46, but this is not limiting. For example, the first plate portions 102A and 102B and second plate portions 104A and 104B may extend in the vehicle front-and-rear direction sandwiching the strut main bodies 36 and 46.

It is preferable if the first plate portions 102A and 102B and second plate portions 104A and 104B are arranged in straight lines sandwiching the strut main bodies 36 and 46, but this is not limiting.

In these exemplary embodiments, the first plate portions 102A and 102B and second plate portions 104A and 104B are provided at the struts 34A and 44A that are connected with the floor wall 12 and the upper wall 18, but this is not limiting. The first plate portions 102A and 102B and second plate portions 104A and 104B may be provided at struts that extend from one toward the other of the floor wall 12 and the upper wall 18 (and are not connected to the other).

In these exemplary embodiments, the first penetrating holes 110A and second penetrating holes 112A are recited as being holes with circular shapes in cross section, but this is not limiting. For example, the holes may be holes with square shapes in cross section.

Plural exemplary embodiments among the first to fourth exemplary embodiments may be employed in combination.

What is claimed is:

1. A fuel tank comprising:
   a fuel tank main body that is enclosed by a floor wall, side walls and an upper wall, and inside which fuel is stored; and
   a separator including
      a strut provided at at least one of the floor wall or the upper wall,
      a first plate portion in which at least one penetrating hole that penetrates in a plate thickness direction is formed, the first plate portion extending in a diametric direction from the strut, and
      a second plate portion in which at least one penetrating hole that penetrates in a plate thickness direction is formed, the second plate portion sandwiching the strut with the first plate portion and extending in a diametric direction at an opposite side of the strut from a side thereof at which the first plate portion is disposed,
   wherein at least one of shapes, sizes or numbers of the at least one penetrating hole of the first plate portion and the at least one penetrating hole of the second plate portion is set to be different such that fluid resistances at the first plate portion and the second plate portion are different,
   wherein the at least one penetrating hole of the first plate portion decreases in diameter from a face at one side of the first plate portion toward a face at another side thereof, and
   wherein the at least one penetrating hole of the second plate portion increases in diameter from a face at the one side of the second plate portion toward a face at the other side thereof.

2. The fuel tank according to claim 1, wherein the at least one penetrating hole of the first plate portion and the at least one penetrating hole of the second plate portion are circular holes, and the at least one penetrating hole of the first plate portion and the at least one penetrating hole of the second plate portion differ in hole diameter, and
   wherein a rotary flow of fuel rotating from the first plate portion toward the second plate portion around the strut in plan view is produced.

3. The fuel tank according to claim 1, wherein a strut penetrating hole is formed in the strut, the strut penetrating hole penetrating through the strut in a same direction as a direction of extension of the at least one penetrating hole of the first plate portion and the at least one penetrating hole of the second plate portion, and wherein a rotary flow of fuel rotating from the first plate portion toward the second plate portion around the strut in plan view is produced.

4. A fuel tank comprising:
a fuel tank main body that is enclosed by a floor wall, side walls and an upper wall, and inside which fuel is stored; and
a separator including
   a strut provided at at least one of the floor wall or the upper wall,
   a first plate portion in which at least one penetrating hole that penetrates in a plate thickness direction is formed, the first plate portion extending in a diametric direction from the strut, and
   a second plate portion in which at least one penetrating hole that penetrates in a plate thickness direction is formed, the second plate portion sandwiching the strut with the first plate portion and extending in a diametric direction at an opposite side of the strut from a side thereof at which the first plate portion is disposed,
wherein at least one of shapes, sizes or numbers of the at least one penetrating hole of the first plate portion and the at least one penetrating hole of the second plate portion is set to be different such that fluid resistances at the first plate portion and the second plate portion are different, and
wherein a bending stiffness of the first plate portion is different from a bending stiffness of the second plate portion.

5. The fuel tank according to claim 4, wherein a reinforcing rib is formed at at least one of the first plate portion or the second plate portion.

6. The fuel tank according to claim 4, wherein:
the fuel tank main body includes a first storage portion, a second storage portion and a connecting portion, each of the first storage portion and the second storage portion being enclosed by a floor wall, side walls and an upper wall and the fuel being stored thereinside, and the connecting portion putting an upper portion of the first storage portion into fluid communication with an upper portion of the second storage portion,
respective separators are disposed in the first storage portion and the second storage portion, and
a rotary flow of fuel rotating from the first plate portion toward the second plate portion around the strut in plan view is produced.

7. A fuel tank comprising:
a fuel tank main body that is enclosed by a floor wall, side walls and an upper wall, and inside which fuel is stored; and
a separator including
   a strut provided at at least one of the floor wall or the upper wall,
   a first plate portion in which at least one penetrating hole that penetrates in a plate thickness direction is formed, the first plate portion extending in a diametric direction from the strut, and
   a second plate portion in which at least one penetrating hole that penetrates in a plate thickness direction is formed, the second plate portion sandwiching the strut with the first plate portion and extending in a diametric direction at an opposite side of the strut from a side thereof at which the first plate portion is disposed,
wherein at least one of shapes, sizes or numbers of the at least one penetrating hole of the first plate portion and the at least one penetrating hole of the second plate portion is set to be different such that fluid resistances at the first plate portion and the second plate portion are different,
wherein the fuel tank main body includes a first storage portion, a second storage portion and a connecting portion, each of the first storage portion and the second storage portion being enclosed by a floor wall, side walls and an upper wall and the fuel being stored thereinside, and the connecting portion putting an upper portion of the first storage portion into fluid communication with an upper portion of the second storage portion,
wherein respective separators are disposed in the first storage portion and the second storage portion, and
wherein a rotary flow of fuel rotating from the first plate portion toward the second plate portion around the strut in plan view is produced.

* * * * *